Dec. 9, 1952     D. V. L. LINDSTRÖM ET AL     2,621,268
CONNECTING DEVICE OF THE LIQUID MANOMETER TYPE
Filed July 3, 1950
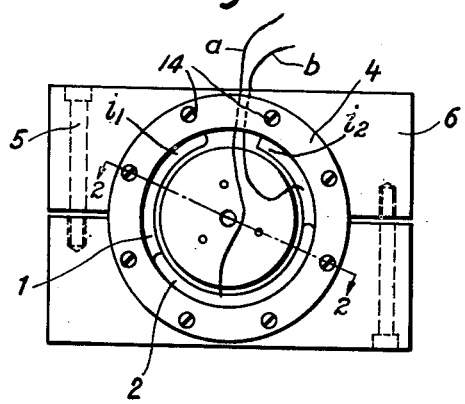
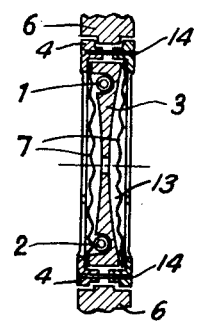
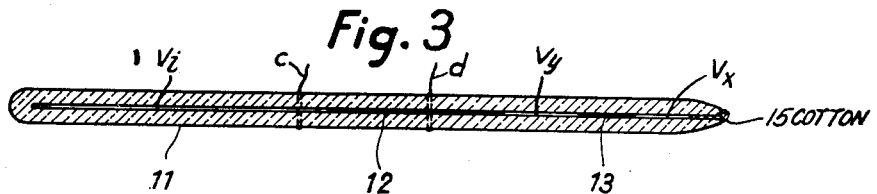
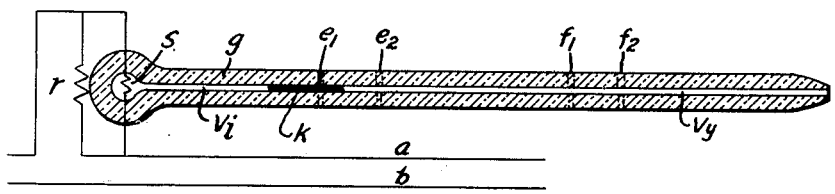
Inventors
D. V. L. Lindström
G. I. Jedvall Patented Dec. 9, 1952

2,621,268

UNITED STATES PATENT OFFICE 2,621,268

CONNECTING DEVICE OF THE LIQUID MANOMETER TYPE

Dag Viktor Ljuslin Lindström, Alsten, Bromma, and Gustaf Ivar Jedvall, Stockholm, Sweden, assignors to Telefonaktiebolaget L. M. Ericsson, Stockholm, Sweden, a company of Sweden Application July 3, 1950, Serial No. 171,962
In Sweden July 4, 1949

20 Claims. (Cl. 200—81.6)

The present invention relates to liquid manometers for the automatic detection and remote recording or indication of pressure, in vessels such as cables filled with gases at low pressure.

In the devices of the invention a gas pressure in, for example, the cable determines the position of a liquid drop or column of an electrically conducting liquid, said drop being provided in, for example, a glass tube. The manometer according to the invention is specially adapted to detect and localize faults in cable plants comprising cables filled with gases at low pressure. The manometers are dimensioned so that they can be arranged at each joint of the line and so that the conducting liquid electrically cooperates with contacts fused in the tube and connected to a supervising central by means of suitable signalling wires. It is thus made possible—in a manner known per se—to provide for an alarm at the central point when the pressure in, for example, the cable falls below a certain value, it being also possible to localize, from the central, the position of the fault.

The invention will be more fully described with reference to the accompanying drawings showing three embodiments. In the drawings, Fig. 1 is a front elevation of one form of the invention, Fig. 2 is a sectional view taken on line 2—2 of Fig. 1, Fig. 3 is a longitudinal section of another form of the invention, and Fig. 4 is a similar view of still another modification.

The small dimensions of the manometer of the invention makes it possible to place it inside the lead sheath covering at a cable joint, for example a coaxial cable joint.

In Figures 1 and 2 there is shown a circular glass tube 1, closed at one end and open at its other end and enclosing a column of mercury 2. The column has continuous contact with a thin platinum wire $a$ fused in the tube. The mercury in the tube is chemically clean and practically free from gases. Furthermore, the gases with which it is in contact do not affect it; for example in the tube on one side of the column 2 the gas is hydrogen, and on the other side nitrogen, or vice versa. Should the mercury surfaces in the two branches $i_1$ and $i_2$ of the tube be equal as a result of a leakage in the glass tube, the contact between said platinum wire $a$ and a further platinum wire $b$, which is also fused in the tube, will however not be closed for a long time, since wire $b$ is placed above the mercury surface. Thus there is protection against the pressure control being disturbed if a manometer should be damaged, if say the glass tube is broken by heavy injury to the cable joint in which the manometer has been enclosed. The two platinum wires $a$ and $b$ are connected to a control pair in the cable (not shown). Thus an alarm signal—in a manner known per se—is given at the central when the mercury drop 2 connects the wires $a$ and $b$. When the manometer is in working order and the pressure normal in the controlled cable, the wire $b$ lies above the mercury surface without touching it. If the pressure in the cable falls because of a leakage in the lead sheath of the cable, the wire $b$ comes into contact with the mercury at a certain fixed pressure.

To prevent the mercury from penetrating into the cable if the glass tube is broken and to prevent oxidation of the surface of the mercury near the wire $b$, the glass tube may be placed in a casing. Said casing consists of a disc 3 (preferably of Plexiglas) provided with a circular groove in which the tube 1 is located, and metal rings 4 secured together by means of screws 14 and including also two thin flexible diaphragms 7 (for example, of cellulose-acetate which is capable of resisting the mercury vapours). The variations in the pressure in the cable are transmitted through said diaphragms.

The fine adjustment of the manometer is very simple and effective. The whole assembly of metal rings 4, including the glass tube, is made turnable in two Bakelite blocks 6, which can be clamped by means of screws 5. The fine adjustment may be accomplished quickly, suitably before the manometers are placed in the cable. It is always possible to determine the position of the block in the cable with the accuracy required for fine adjustment, by a turning movement in relation to a body whose position in the chamber is fixed, thereby using the effect of the gravity on the conducting column 2 of mercury.

The manometers are placed in a cable in such a manner that the short-circuits which may take place therein upon occurrence of a defect, indicate the distance to the place where the defect has arisen.

If two manometers, of which one always gives the alarm at lower pressure than the other, are placed at each pressure control point, an accurate measure of the velocity of the change of pressure is obtained. It is easy to set two manometers mutually so that the difference between their alarm pressure is accurately determined by calibration.

Another embodiment of the manometer is shown in Fig. 3. It consists of a thick walled glass tube 11 closed at one end and having an opening at the other end. The cross section of the inner channel of the tube is substantially circular and as uniform as possible along the whole length of the tube. Two columns or bodies 12 and 13 of mercury are arranged in the tube and they enclose two masses of gas, $Vi$ and $Vy$, both inert chemically to mercury. There are also two contact wires $c$ and $d$ of platinum. For a glass tube with defined dimensions and defined measure between all fixed parts, the pressure at which the manometer is to function is determined by the length and placing of the inner mercury column. The inner gas chamber $Vi$ may naturally be completed with an extension at the end of the tube, for example, as disclosed in Fig. 4, whereby the movement of the mercury column will increase at a certain change of pressure. The platinum wires may also be arranged to meet the mercury surfaces at points placed in the center of the channel or as small quills perpendicular to the inner wall of the glass tube over their whole length.

In principle, the tube may be so dimensioned and the two columns of mercury be placed such a distance from each other that they never touch the same part of the glass tube during normal change of pressure. Practically all transmission of metal between the columns or drops is thereby eliminated.

It is difficult to prevent disintegration of the mercury or other liquid drops if they are not arranged around suitable fixed bodies. This phenomenon takes place especially when tubes with too great a diameter are used. If the diameter of the tube is reduced below 1.5 mm. the columns of mercury have sufficient stability although the diameter may be reduced still further, to a few tenths of a millimeter. In the last case the sensitivity to vibrations is further reduced and less material is required, but the capillary and friction forces are not favorable. Certain discontinuous changes of the position of the mercury drops occur with continuous changes of pressure, which can reduce the accuracy of the sensitive members considerably.

For the reasons discussed above, tube diameters between 1.5 and 0.2 mm. are particularly suitable, but they require particular experience of the technical problems involved in their construction and filling.

The described embodiment according to Fig. 3 makes possible a space saving and constructively simple solution, the outer drop 13 functioning as an ideal "diaphragm" and preventing all oxidation of the external or "working" surface of the inner drop. The external surface of the outer drop may become somewhat oxidized eventually, but this does not represent any disadvantage. Since it is always desirable to prevent disintegration of liquid drops with rapid variations in pressure, a cotton packing 15 can be placed in the inlet to the glass tube.

Prevention of oxidation of the surfaces of mercury has also been tried utilizing oil, for instance creosote, thus producing lubrication, so that there is a higher disruptive strength between the contacts and surfaces of mercury when the drops are in their normal initial position. However, there are two disadvantages, one of which has so far made the method prohibitory. A higher voltage in the measuring circuit is necessary to prevent trouble arising from an oil film around the platinum wires but this is not particularly troublesome, since a high measuring voltage may entail certain other advantages. It has however been observed with long run experiments, that the oil creeps past the drops of mercury, the make pressure of the manometers thus being upset. The outer liquid drop 13 may according to Fig. 3 possibly consist of some suitable oil.

Long run experiments have further shown that a certain aging takes place, which is characterised in that the pressure, at which make or break takes place to begin with is not constant, but reaches after one or two weeks a permanent value which is somewhat lower than the initial value. Before using the manometer, therefore, an artificial aging may be obtained either by the liquid drops being compelled to move to and fro a sufficient number of times during a relatively short time, or by the "age reduction" being measured and setting being made accordingly, or finally by the mercury being very thoroughly freed from gas when introduced into the glass tube. The first method is probably the cheapest. The aging phenomenon most probably depends on the columns of mercury emitting small quantities of gas.

The volume $Vx$ outside the outer mercury column 13 in the tube 11 (Fig. 3) may during manufacture be filled with a wholly inert gas, the open end of the tube thereafter being closed, moisture and harmful matters thus being prevented from penetrating to the tube. Such devices may then be transported refrigerated, in carbon dioxide snow. The low temperature makes the mercury columns less mobile, the risk of damage through vibration or jarring during transport thus being reduced.

The embodiment shown in Fig. 3 is so cheap in comparison with known devices, that it may very likely allow the introduction of gas pressure protection in large local telephone cable networks. These networks, in which functional disturbances caused by humidity can cut off thousands of subscribers from the telephone, would certainly have been protected by means of gas pressure within the cable sheaths, if pressure-tight plugs had not until now been considered unavoidable in such networks. Since these plugs are expensive and large quantities of them are required, such pressure protection has up to now only been in use to a very small extent.

The price of the contact manometers according to the invention is about $\frac{1}{5}$ to $\frac{1}{10}$ of the cheapest known type and they are furthermore considerably cheaper to mount than other contact manometers, and additionally diminish the need of pressure-tight plugs in a large local cable network. Instead a great number of manometers may be inserted and a great leakage of gas be permitted. All the cables can now be held at a certain pressure in their middle, by means of a gas compressor aggregate of large dimensions, and be given a pressure near atmospheric pressure at their ends by suitably placed and dimensioned leaks. In normal operation, none of the sensitive members function and the cables are pressure-protected more effectively in their middle sections than at their ends. The protection is however sufficient and entails only negligible costs for wear of the compressors and energy consumption. Small leakages mean only an increase of the energy consumption, while big leakages make themselves known by alarm at one or several of the manometers. The localization of the leakage and the repair then take place quickly without the traffic being impaired by infiltration of moisture.

The tubes utilized for the invention may consist of all kinds of glass, or preferably of transparent moulding material. Besides mercury, the outer column of liquid may consist of oil or of another non-conducting liquid, which preferably is not susceptible to oxidation.

In all the devices described above, the measurement is based on the position of a conducting liquid indicating the properties of the object to be measured.

It is however possible to produce contact after a certain time and at a certain pressure by electric, possibly remote-controlled heating, of the gas in the closed chamber within the conducting liquid. In the last mentioned case the quality of the object to be measured is determined by the position of the mercury column and of the energy required to bring the column to said position or of the effect required to retain the column in said position (temperature balance). A relation can thereby be obtained between the supplied effect, the time during which the effect works, and the pressure to be measured, so as to make accurate remote-measurement of the pressure possible. Temperatures can also be measured according to the same principle. A drop of conducting liquid is for example made to delimit two closed volumes. The quantity of energy which has to be supplied to the contents of one of the volumes to cause contact to be made, can be made to corrrespond to the initial temperature of the contents of both volumes or of one only.

The position of the mercury column in these cases is thus determined not only by the magnitude to be measured but also by the energy or constant effect being supplied to the device. In case several manometers are provided in a network it is thus easy to examine which one of the manometers lies nearest to the alarm pressure. This last mentioned embodiment is described more particularly with relation to Fig. 4, which shows a schematically drawn contact manometer consisting of a tube $g$ surrounding two cylindrical volumes of gas $Vi$ and $Vy$. The inner volume $Vi$ ends at the left in a bulb-like extension and at the right in a drop or column of mercury $k$. The outer volume $Vy$ opens to the right into the gas receptacle whose pressure is to be measured, and is limited to the left by the drop of mercury. Two pairs of contact wires $e_1$ and $e_2$ and $f_1$ and $f_2$ of a platinum alloy have been fused in the glass wall and extend into the space enclosed by the wall. The first pair of wires $e_1$ and $e_2$ is connected to the branches of a pair of conductors going to a supervisory-central and the contact wires $f_1$ and $f_2$ are connected to another pair. The conductors and the central are not shown on the drawing. The column of mercury $k$ is so long that it can short-circuit $e_1$ and $e_2$ or $f_1$ and $f_2$ thereby short-circuiting the first or the second pair of conductors. The column cannot connect metallically the contact wires $e_2$ and $f_1$. A third pair of conductors is provided, a control pair (disclosed in the drawing), the branch $a$ of which has been connected in series with two impedances $s$ and $r$ connected in parallel. The first impedance $s$ consists of a heating coil of suitable metal (possible platinum) which has been pressure-tight sealed in so that it works on the gas volume in $Vi$. The other impedance $r$ is a calibration impedance, which enables matching of the manometer in order to give it the desired characteristic when being heated. The supervisory central is supposed to comprise a kind of indicating instrument indicating when the contacts $e_1$ and $e_2$ or $f_1$ and $f_2$ are electrically connected with one another by means of the mercury column $k$.

The manometer is constructed in such a way that even at the lowest pressure to which the object to be measured may be exposed, the drop $k$ of mercury cannot reach $e_2$ with its right end, and it is therefore possible to measure any pressure of the object, provided it does not come up to the value at which the mercury would flow into the space where $s$ is placed.

The following method is then used to measure the pressure: a fixed current (D. C. or A. C.) (intensity about one milliampere) is supplied through the $a$-branch and returned through the $b$-branch or earth. A certain accurately calibrated effect must be supplied to the heating coil $s$ in the gas volume $Vi$. Since the inner gas quantity must have the same pressure as the object to be measured, the inner gas volume increases with temperature. The drop of mercury $k$ then begins to move to the right and, after a certain time, $e_1$ and $e_2$ are short circuited, this being indicated at the supervisory central. Exactly the same current intensity is however still supplied to $s$ and the mercury column $k$ continues its way until it short-circuits $f_1$ and $f_2$, this also being indicated at the station. The time which is needed, with a certain current intensity through the heating coil $s$, from the short-circuiting of $e_1$—$e_2$ to the short-circuiting of $f_1$—$f_2$ corresponds, at a certain initial temperature of the measuring device and the object to be measured, to a certain pressure at the place undergoing measurement, it being thus possible to measure said pressure. This assumes that the same pressure has prevailed during the short time required for a measurement, and that the greater portion of the supplied energy heats only the gas. If the heating losses are great—being actually the most usual case—a state of equilibrium arises very rapidly for each supplied constant effect, said effect thus being a measure of the pressure. In both cases the measurement does not take long. The initial temperatures of the measuring apparatus and the object to be measured are not important when measuring the pressure in telephone cables. These temperatures are then equal and the temperature to be measured changes only insignificantly in earthed cables, relatively slowly even in air cables. Furthermore, an error of a degree or so in the initial temperature means only an error of a few percent, and this can be further reduced since the supplied quantity of energy can increase the temperature of the gas of the inner volume from 50 to 100° C.

The embodiment according to Fig. 4 just described may be modified in several ways, as follows:

A protecting drop described above in connection with Fig. 3 (reference 13) may also advantageously be provided in an embodiment according to Fig. 4, and placed so far from the short-circuiting drop that the two drops in a manometer never run along the same portions of the tube.

In the described embodiment according to Fig. 4, three separate pairs of conductors have been used for the sake of clearness, but this number can be reduced. Theoretically there is no obstacle to using one wire only with the earth, but rectifiers must then separate the two short circuits to identify them at the terminals of the signal wire by reversing the measuring currents. By using alternating current for the heating coils and direct current for the conductors connected to the contacts $e_1$—$e_2$ and $f_1$—$f_2$, or vice versa, it is also possible to reduce the number of signal pairs required for remote control of several manometers.

If a number of manometers according to Fig. 4 are provided in a cable network and it is desired that they shall function in a certain series, this may be achieved by connecting silicon-carbide resistances, or other non-linear elements having different characteristics, to the calibrating impedances $r$. The manometers may thus be chosen one by one by successive decreasing of the voltages supplied to the heating coils.

The contact manometers, shown principally in Fig. 3, should be constructed with great accuracy so that they have but small variations as regards the inner diameter of the tube as well as the distance between the contact wires and the length of the contact-making columns of mercury. It is otherwise difficult to calibrate them so that they function at definite pressures.

Instruments of the type shown in Fig. 4 do not require the same precision of materials and production as those described in Fig. 3, since they may be calibrated in electrical effect or energy, and thus give a reliable result in spite of greater tolerances in dimensions. The process of production is thereby simplified and the percentage of rejects decreases.

The impedances $r$ and $s$ connected in parallel, which characterise each manometer according to Fig. 4, have been connected in series with a pair of control conductors. They may naturally also be connected in parallel over the pair of control conductors. The heating of the heating coil $s$ may continue after contact between $f_1$ and $f_2$ is made, so that the drop of mercury slides relatively quickly past them. The movement of the drop can be forced if the last mentioned short-circuiting automatically increases the speed with which the enclosed volume of gas is heated. By this means a long time will not elapse after contact is made between $f_1$ and $f_2$, before the contact between them is broken again, whereafter the drop can by continued heating be kept in such a position that said contact remains broken during the desired time period. If a common pair of conductors is used for a large number of manometers, this is naturally useful, since a certain manometer then does not "conceal" the short-circuitings of other manometers which lie beyond said certain manometer, counted from one end of said pair along the pair of conductors.

By introducing resonance circuits in the calibrating impedances $r$ it is possible to measure with a certain desired manometer among a number of manometers, the heating coils of which latter are heated electrically over a common conductor. The heating coil of an arbitrary manometer may thus be heated by choice of a suitable frequency.

It is possible at the same time to heat all of the manometers continuously and simultaneously, by means of direct currents.

It may be desired to arrange matters so that the column of liquid in one manometer operates to connect the heating coil of the following manometer, after the indication is obtained, so that the pressure can be read automatically at successive points. Finally, it is desirable that the manometers, when not heated, can give an alarm at suitable pressures.

We claim:

1. A liquid manometer contact-making device for the remote indication of gas pressure, comprising a tube of insulating material having a bore and having one of its ends closed and the other open, spaced-apart contact members fused in said tube and in communication with said bore, a column of electrically conductive liquid within said bore and substantially shorter than the length of said tube whereby said column may move upon variations in external gas pressure to make contact with said members, a sealing element displaceable along said bore and disposed between said column and the open end of said tube, and a volume of inert gas provided within said bore between the closed end of said tube and said column on one side thereof, and between the sealing element and said column on the other side thereof.

2. The device in accordance with claim 1, and a porous packing provided adjacent and within the open end of said tube.

3. The device in accordance with claim 1, in which said tube is substantially straight.

4. The device in accordance with claim 1, in which said tube has an arcuate shape, the volume of liquid therein being so chosen, and the contact elements in said bore being so positioned that said elements lie on opposite sides of a horizontal plane passing through the two terminal faces of said column when the plane of said tube is vertical.

5. The device in accordance with claim 1, and means for mounting said tube for rotation about an axis perpendicular to a plane containing said bore.

6. The device in accordance with claim 1, in which said sealing element constitutes a column of fluid.

7. The device in accordance with claim 6, in which said tube is a capillary tube.

8. The device in accordance with claim 7, in which the inside diameter of said capillary tube lies between 0.2 and 1.5 mm.

9. A liquid manometer contact-making device for the remote indication of gas pressure, comprising a tube of insulating material having a bore and having one of its ends closed and the other end open, spaced-apart contact members fused in said tube and in communication with said bore, a column of electrically conductive liquid within said bore and substantially shorter than the length of said tube whereby said column may move upon variations in external gas pressure to make contact with said members, a volume of inert gas provided within said bore between the closed end of said tube and said column, and means for heating the gas.

10. The device in accordance with claim 9, including a sealing element displaceable along said bore and disposed between said column and the open end of said tube, and a second volume of inert gas in said bore between said column and said sealing element.

11. The device in accordance with claim 9, and a calibration impedance connected across said heating element.

12. The device in accordance with claim 11, in which said impedance includes a non-linear resistor.

13. The device in accordance with claim 11, in which said impedance comprises a resonant circuit.

14. The device in accordance with claim 1, in which the lengths of said column and of said sealing element, and the spacing therebetween, are so chosen that during operation of the device said column and said element contact only mutually exclusive portions of the inner wall of said bore.

15. The method of preparing for transport a manometer tube of the type comprising a hollow tube having a bore with one closed and one open end, a volume of gas within said tube and a column of liquid confining said gas between it and the closed end, and the remainder of said bore containing a volume of inert gas, comprising closing the normally open end of said tube with a temporary closure, refrigerating said tube to a temperature sufficiently low to reduce the mobility of said column, and maintaining said tube under such refrigeration until its arrival at the point of use.

16. A liquid manometer contact-making device for the remote indication of gas pressure, comprising a tube of insulating material having a bore and having one of its ends closed and the other open, spaced-apart contact members fused in said tube and in communication with said bore, a column of electrically conductive liquid within said bore and substantially shorter than the length of said tube whereby said column may move upon variations in external gas pressure to make contact with said members, a chamber outside said tube and communicating with the open end thereof, resilient means hermetically confining said chamber, a volume of inert gas being provided within said bore between the closed end of said tube and said column and a second volume of inert gas within said bore and said chamber and between said column and said resilient means.

17. A manometer contact-making device operable in accordance with variations in gas pressure, comprising a hollow tube closed at one end and open at the other, spaced-apart contact members in said tube in communication with said bore, a short column of electrically conductive liquid in said bore, a volume of inert gas between the closed end of said bore and said liquid, another volume of inert gas in said bore on the other side of said liquid column, and means for transmitting variations in pressure to said second volume of gas whereby to move said column into and out of circuit-closing relation to said contacts.

18. A liquid manometer contact-making device for the remote indication of gas pressure, comprising a tube of insulating material having a bore and having one of its ends closed and the other open, spaced-apart contact members fused in said tube and in communication with said bore, a column of electrically conductive liquid within said bore and substantially shorter than the length of said tube, whereby said column may move upon variations in external gas pressure to make contact with said members, a further column of liquid within said bore and disposed between said first mentioned column and the open end of said tube, a volume of inert gas provided within said bore between the closed end of said tube and said first mentioned column, and a further volume of inert gas between said both columns.

19. The device in accordance with claim 18, in which said tube is a capillary tube, the inside diameter of said capillary tube lying between 0.2 and 1.5 mm.

20. The device in accordance with claim 18, in which the lengths of said columns, and the spacing therebetween, are so chosen that during operation of the device, said columns contact only mutually exclusive portions of the inner wall of said bore.

DAG VIKTOR LJUSLIN LINDSTRÖM.
GUSTAF IVAR JEDVALL.

REFERENCES CITED

The following references are of record in the file of this patent:

UNITED STATES PATENTS

| Number | Name | Date |
| --- | --- | --- |
| 946,364 | Hookham | Jan. 11, 1910 |
| 1,078,785 | Grossman et al. | Nov. 18, 1913 |
| 1,522,153 | Van Deventer | Jan. 6, 1925 |
| 1,625,703 | Bobo | Apr. 19, 1927 |
| 2,047,902 | Eitzen | July 14, 1936 |
| 2,566,369 | Putman | Sept. 4, 1951 |

FOREIGN PATENTS

| Number | Country | Date |
| --- | --- | --- |
| 135,332 | Switzerland | Sept. 15, 1929 |
| 576,002 | France | Aug. 9, 1924 |